(12) United States Patent
Sun et al.

(10) Patent No.: US 6,721,042 B1
(45) Date of Patent: Apr. 13, 2004

(54) FIBER OPTIC APPARATUS AND METHOD FOR CROSS-CONNECTING OPTICAL FIBERS

(75) Inventors: Maurice X. Sun, Naperville, IL (US); Igor Grois, Northbrook, IL (US); Jerome M. Scherwin, Plainfield, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/371,314

(22) Filed: Feb. 18, 2003

(51) Int. Cl.[7] .............................. G02B 6/44; G02B 6/38
(52) U.S. Cl. ......................................... 355/114; 385/63
(58) Field of Search .............................. 385/114, 59, 63, 385/86; 156/150; 362/554

(56) References Cited

U.S. PATENT DOCUMENTS 3,728,422 A * 4/1973 Sugaya ..................... 264/1.24
3,881,976 A * 5/1975 Jones ......................... 156/180
6,361,198 B1 * 3/2002 Reed .......................... 362/554

* cited by examiner

Primary Examiner—Chandrika Prasad
(74) Attorney, Agent, or Firm—Romi N. Bose; A. A. Tirva (57) ABSTRACT

A fiber optic apparatus and method are provided for cross-connecting the individual optical fibers of a plurality of fiber optic ribbons. A plurality of individual optical fibers are routed on a flat substrate to form at least one first fiber optic ribbon leading onto the substrate and at least one second fiber optic ribbon leading away from the substrate to a terminating end of the ribbon. The individual optical fibers of at least the second fiber optic ribbon being routed in a predetermined sequence from one side of the ribbon to an opposite side thereof. The individual optical fibers at the terminating end of the second fiber optic ribbon are cut-off at different lengths in a predetermined pattern correlated to the predetermined sequence of fibers in order to visually identify any fiber which is out of the predetermined sequence.

10 Claims, 6 Drawing Sheets

FIBER OPTIC APPARATUS AND METHOD FOR CROSS-CONNECTING OPTICAL FIBERS

FIELD OF THE INVENTION

This invention generally relates to the art of optical fibers and, particularly, to a fiber optic apparatus and method for cross-connecting the individual optical fibers of a plurality of fiber optic ribbons.

BACKGROUND OF THE INVENTION

Fiber optic circuitry is increasingly being used in electronics systems where circuit density is ever-increasing and is difficult to provide with known electrically wired circuitry. An optical fiber circuit is formed by a plurality of optical fibers carried by a dielectric, and the ends of the fibers are interconnected to various forms of connectors or other optical transmission devices. A fiber optic circuit may range from a simple cable which includes a plurality of optical fibers surrounded by an outer cladding or tubular dielectric to a more sophisticated optical backplane or flat fiber optic circuit formed by a plurality of optical fibers mounted on a substrate in a given pattern or circuit geometry.

One type of optical fiber circuit is produced in a ribbonized configuration wherein a row of optical fibers are disposed in a side-by-side parallel array and coated with a matrix to hold the fibers in the ribbonized configuration. This often is called "ribbonizing" In the United States, an eight-fiber ribbon or a twelve-fiber ribbon have become common. In other foreign countries, the standard may range from as a low as four to as high as twenty-four fibers per ribbon. Multi-fiber ribbons and connectors have a wide range of applications in fiber optic communication systems. For instance, optical splitters, optical switches, routers, combiners and other systems have input fiber optic ribbons and output fiber optic ribbons.

With various applications such as those described above, the individual optical fibers of input fiber optic ribbons and output fiber optic ribbons are cross-connected or reorganized whereby the individual optical fibers of a single input ribbon may be separated and reorganized into multiple or different output ribbons. The individual optical fibers are cross-connected or reorganized in what has been called a "mixing zone" between the input and output ribbons.

Optical backplanes are fabricated in a variety of manners, ranging from laying the optical fibers on a substrate by hand to routing the optical fibers in a given pattern or circuit geometry onto the substrate by mechanized apparatus. The individual optical fibers are cross-connected or reorganized on the substrate between input and output ribbons projecting from input and output ends or edges of the substrate. Therefore, the above-mentioned "mixing zone" is provided by the substrate, itself. The input and/or output ribbons which project from the edges of the substrate then are cut-off at predetermined lengths according to the backplane specifications and are terminated to a plurality of fiber optic connectors.

With cross-connecting apparatus as described above, it is important that the individual optical fibers of any particular fiber optic ribbon be in a predetermined sequence. In other words, it is important than an operator be able to know which tiny individual fiber of each ribbon is the "1" or the "8" fiber within the ribbon with the fibers hypothetically numbered from one side or edge of the ribbon sequentially to the opposite or edge of the ribbon. This is important in terminating the ribbons to the fiber optic connectors, as described above. The connector typically tells an operator where the "#1" and/or the "#8" fiber is to be inserted into the connector. Typically, the fiber optic ribbons are cut-off immediately before termination of the ribbons in the connectors. If one of the tiny individual fibers is out of sequence, the circuit scheme of the connector is destroyed and, once the fibers are permanently fixed within the connector, the entire cross-connecting apparatus or harness must be discarded and wasted.

Heretofore, fiber-orientation inspections or testings have been made to assure that the fiber sequence is accurate before termination procedures are initiated. One verification system is to manually/visually trace each fiber throughout its entire length as routed along the apparatus. This system is time consuming, inefficient and still subject to human error. A second verification system is to perform optical tests after the fiber optic ribbons are terminated in the connectors. These tests are accurate, but they are conducted after termination and, as stated above, entire apparatus or optical harnesses may have to be discarded at considerable expense if a test reveals a mis-routed fiber or fibers. The present invention is directed to solving these problems by an extremely simple system for cutting the individual optical fibers of the fiber optic ribbons at different lengths in a predetermined pattern correlated to the predetermined sequence of the fibers in the ribbon(s).

SUMMARY OF THE INVENTION

An object, therefore, of the invention is to provide a fiber optic apparatus for cross-connecting the individual optical fibers of a plurality of fiber optic ribbons, the apparatus being fabricated by a method of verifying a predetermined fiber pattern or sequence.

In the exemplary embodiment of the invention, a plurality of individual optical fibers are routed on a flat substrate to form at least one first fiber optic ribbon leading onto the substrate and at least one second fiber optic ribbon leading away from the substrate to a terminating end of the ribbon. The individual optical fibers of at least the second fiber optic ribbon are routed in a predetermined sequence from one side or edge of the ribbon to an opposite side or edge thereof. The individual optical fibers at the terminating end of the second fiber optic ribbon are cut-off at different lengths in a predetermined pattern correlated to the predetermined sequence of fibers, in order to visually identify any fiber which is out of the predetermined sequence.

The invention contemplates that the individual optical fibers of both the first and second fiber optic ribbons be routed in a predetermined sequence, and the individual fibers of each fiber optic ribbon are cut-off at terminating ends thereof in predetermined patterns of different lengths. As disclosed herein, the individual optical fibers are routed onto and off of the substrate to form a plurality of the first fiber optic ribbons and a plurality of the second fiber optic ribbons. All of the ribbons may be cut-off in predetermined patterns with the individual fibers at different lengths.

According to one aspect of the invention, the individual optical fibers at the terminating end of any ribbon are cut-off at progressively different lengths from one side of the ribbon to an opposite side thereof. This creates a "wedge" shaped pattern which makes it very simple and easy for an operator to visually ascertain if any of the individual optical fibers are out of their predetermined sequence.

The invention also contemplates a method of fabricating the fiber optic apparatus descried above, including the termination of the fiber optic ribbons to appropriate fiber optic connectors, after the ribbons are trimmed or cut for termination purposes.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figures 1, 2, 3:
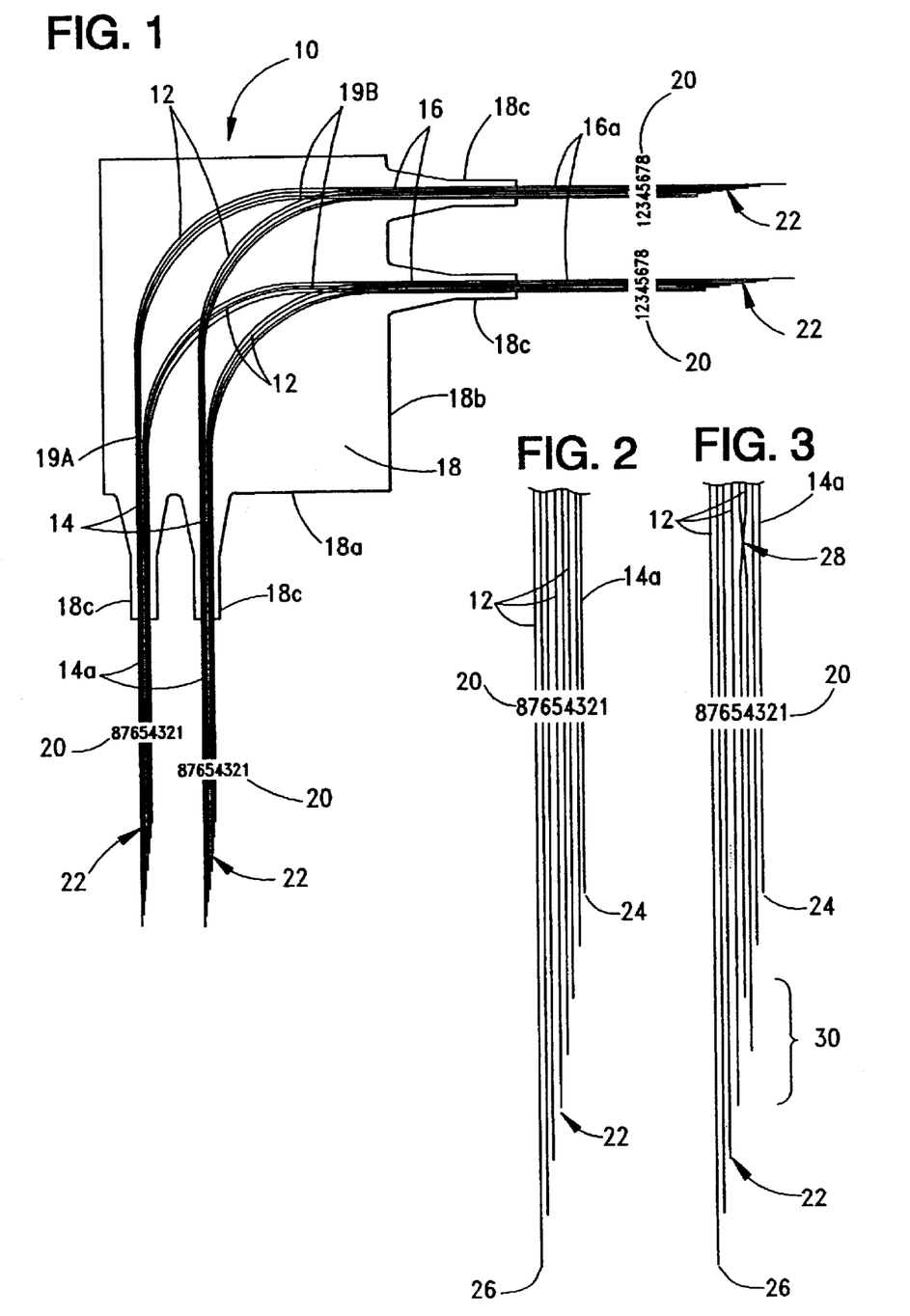
FIG. 1 is a plan view of a fiber optic apparatus according to the invention.
FIG. 2 is an enlarged view of the terminating end of one of the fiber optic ribbons of the apparatus of FIG. 1, showing the predetermined pattern in which the individual fibers of the ribbon are cut-off.
FIG. 3 is a view similar to that of FIG. 2, but showing a pair of the individual fibers improperly routed and out of the predetermined pattern shown in FIG. 2.
Figure 5:
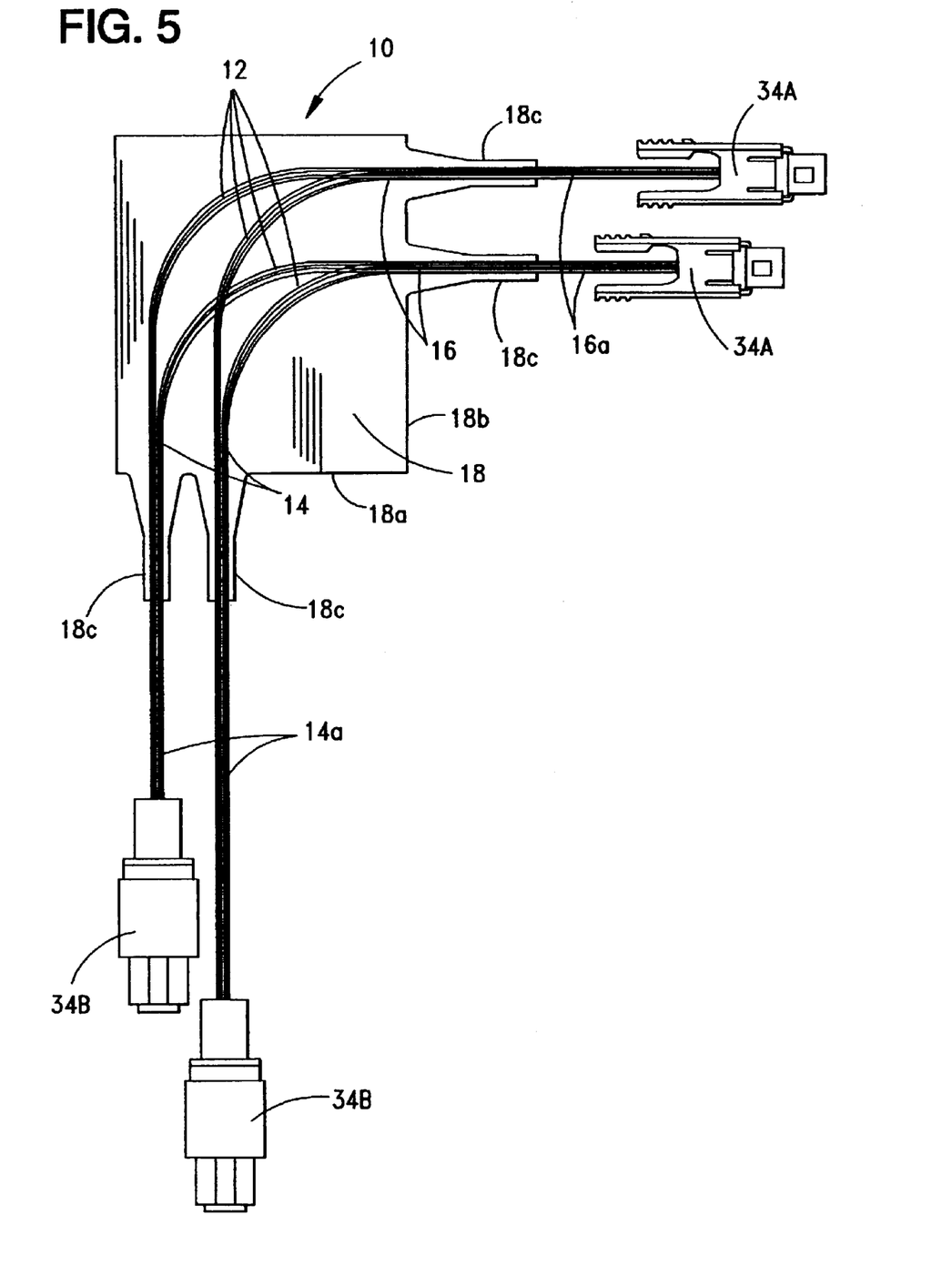
FIG. 5 is a view similar to that of FIG. 4, but showing the ribbons terminated to a plurality of fiber optic connectors.

Referring to the drawings in greater detail, and first to FIG. 1, a fiber optic apparatus, generally designated 10, is shown for cross-connecting individual fibers 12 of a plurality of fiber optic ribbons 14 and 16. The individual optical fibers are routed on a substrate 18 in a side-by-side array to form a plurality of first fiber optic ribbons 14 leading onto one side or edge 18a of the substrate. The fibers are reorganized on the substrate to form a plurality of second fiber optic ribbons 16 which lead away from another side or edge 18b of the substrate. The fibers are routed onto and off of tail portions 18c of the substrate which project outwardly from sides or edges 18a and 18b. With the arrangement of FIG. 1, first fiber optic ribbons 14 may be considered input ribbons, as at 14a, and second fiber optic ribbons 16 may be considered output ribbons, as at 16a. The input and output ribbons project from edges 18a and 18b of the substrate, particularly along and off of tail portions 18c of the substrate. The input and output ribbons eventually are terminated to a plurality of fiber optic connectors as shown in FIG. 5 and described hereinafter.

As stated above, input ribbons 14/14a are reorganized on substrate 18 to form output ribbons 16/16a. In the example of shown in FIG. 1, the input ribbons are split, as at 19A, with one-half of each input ribbon joining one-half of the other input ribbon, as at 19B, to form each of the output ribbons. In the illustrated embodiment, each input ribbon has eight individual optical fibers which are split, as at 19A, with four of the fibers being joined with four fibers of the other input ribbon, as at 19B, to form each of the eight-fiber output ribbons.

Substrate 18 typically has a layer of adhesive on the top surface thereof, and the routed individual optical fibers 12 readily adhere to the surface of the substrate to maintain their position thereon. The individual fibers may be routed by hand or by a mechanized routing machine which typically is computerized. After the individual fibers are properly routed on and adhered to the substrate in a particular circuit geometry, such as the geometry shown in FIG. 1 and described above, a conformal coating is applied over the substrate and the routed fibers. The coating also may be applied to the fibers of input ribbons 14a and output ribbons 16a, off the substrate, to hold the ribbons in their ribbonized form.

As stated in the "Background", above, the individual optic fibers 12 must be reorganized and cross-connected in a predetermined sequence so that they are terminated in the fiber optic connectors according to a specified circuit geometry or sequence. Therefore, the fibers are routed on substrate 18 in that sequence and maintained in that sequence when in ribbonized form. In order to understand this requirement better, hypothetical numbers "1" through "8" have been applied to the drawings, as at 20, to show but one sequence in which the fibers must be routed. In other words, as viewed in FIG. 1, the "#1" fiber in each of input ribbons 14/14a is at the right-hand edge of the ribbons as viewed in FIG. 1, and the "#8" fiber is located at the opposite or left-hand edge of each ribbon. The fibers are hypothetically numbered in sequence from "#1" to "#8". The same type of numerical sequence is shown at 20 for output ribbons 16/16a. FIG. 2 is an enlargement of the terminating end of one of the input ribbons 14a showing the designated sequence 20.

Of course, predetermined fiber sequence 20 is hypothetically shown in the drawings and is not actually marked on the tiny individual optical fibers. This sequence is maintained either by an operator manually routing the fibers on substrate 18, or by the mechanized and computerized routing machine. In other words, a computer file tells the routing machine which fiber is the "#1" fiber, etc.

FIGS. 1 and 2 clearly show the concept of the invention wherein terminating ends 22 of input and output ribbons 14/14a and 16/16a, respectively, are cut-off at different lengths in a predetermined pattern correlated to the predetermined sequence of fibers. FIG. 2 clearly shows how the "#1" fiber is cut-off, at 24, so that it is the shortest fiber. The "#8" fiber is cut-off, at 26, so that it is the longest fiber. All of the fibers "#2–#7" between the first and eighth fibers are cut-off at progressively different lengths from one side or edge of the fiber optic ribbon to the opposite side or edge thereof. This gives a "wedge" appearance or definite pattern to the cut-off fibers of different lengths. If the fibers are routed by hand, the fibers are cut-off in this sequence by an operator. If the fibers are routed by a routing machine, the computer file simply tells the machine that the "#1" fiber is to be cut-off to the shortest length and so on.

With such a verification system as described above, FIG. 3 shows how clearly it is to ascertain that one or more of the individual fibers 12 of any ribbon, such as input ribbon 14a, is out of the predetermined sequence. Specifically, it can be seen that fiber "#3" and fiber "#4" have been reversed or routed over each other, as at 28. Therefore, it is readily apparent in the area designated 30 of the wedge-shaped pattern at terminating end 22 of the ribbon, that the third fiber is longer than the fourth fiber. These out-of-sequence fibers can clearly be seen by an operator. Consequently, either the error is corrected, or apparatus 10 is discarded before terminating the apparatus to expensive fiber optic connectors. Of course, the invention is not limited to a wedge-shaped pattern of cut-off fibers, because other patterns are contemplated which will give a clear visual indication that the fibers have been routed out of sequence.

It can be understood that if the fibers are routed by hand, errors as shown in FIG. 3 may be more prevalent. However, computerized routing machines also can make errors, because of such circumstances where static electricity builds up when the individual fibers are unwound from a supply spool. Under these conditions, some of the fibers may repel each other and jump out of the predetermined sequence because of the static electricity. In addition, if an operator ascertains an error such as shown in FIG. 3, before the entire apparatus is coated with a conformal coating, the operator still can lift the out-of-sequence fibers and reposition the fibers and, thereby, save the expenses of having to discard the entire cross-connecting apparatus.

Figure 4:
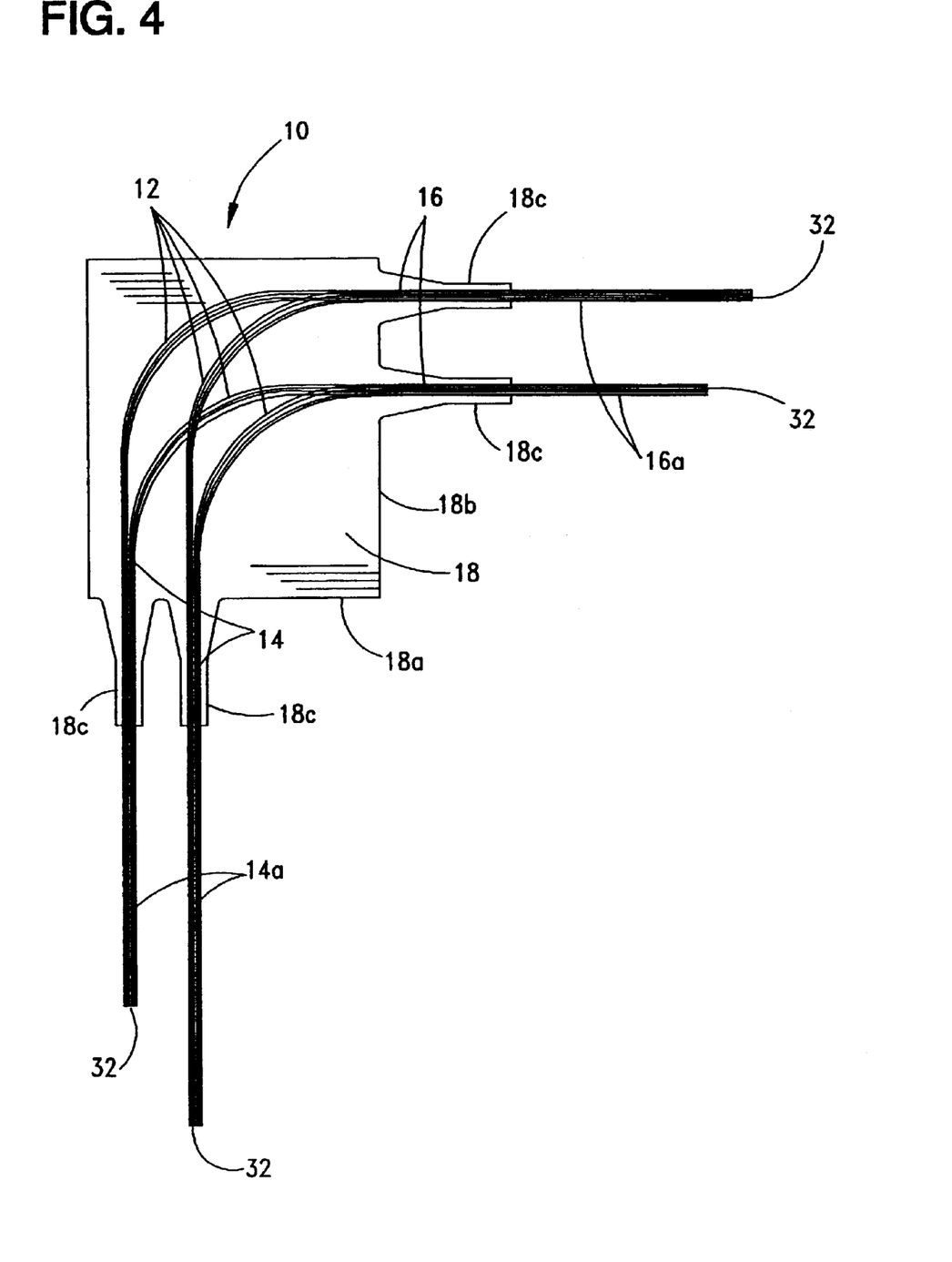
FIG. 4 is a view similar to that of FIG. 1, but showing the fiber optic ribbons off of the substrate being at different lengths and trimmed just prior to termination.

FIG. 4 shows that the individual fibers at terminating ends 22 (FIGS. 1 and 2), are cut-off to the same precise lengths, as at 32, before the fibers are terminated in appropriate fiber optic connectors. This preparation of the terminating ends is done after verifications have been made that the fibers are in their predetermined patterns. The prepared terminating ends then can be terminated in appropriate fiber optic connectors as shown at 34A and 34B in FIG. 5, to provide a finished fiber optic harness. FIGS. 4 and 5 also show that input ribbons 14a and output ribbons 16a can be of different lengths, as compared to the lengths of the ribbons as shown in FIG. 1.

Figure 6:
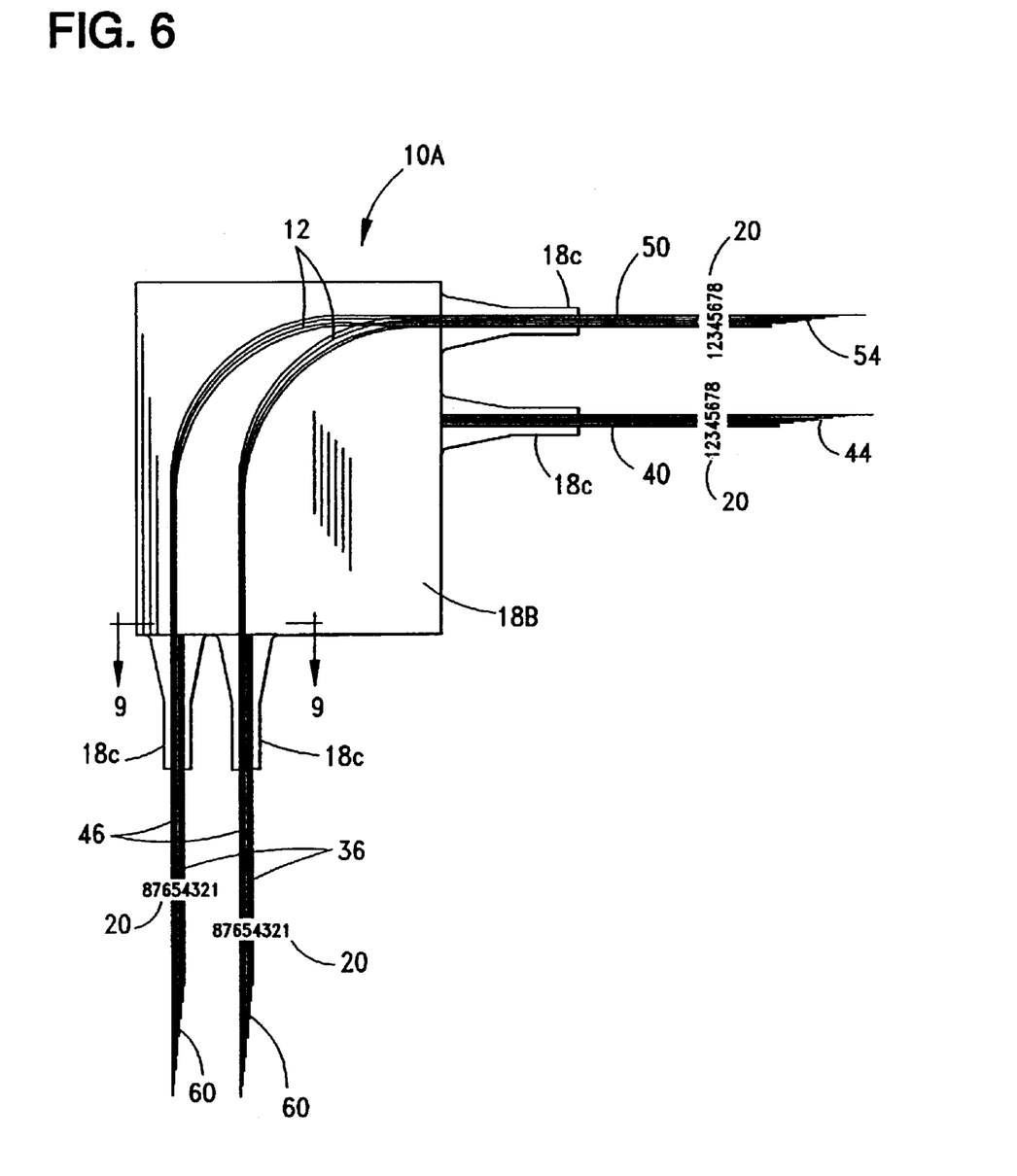
FIG. 6 is a plan view somewhat similar to that of FIG. 1, but showing a different embodiment comprising a multi-layered apparatus.
Figure 7:
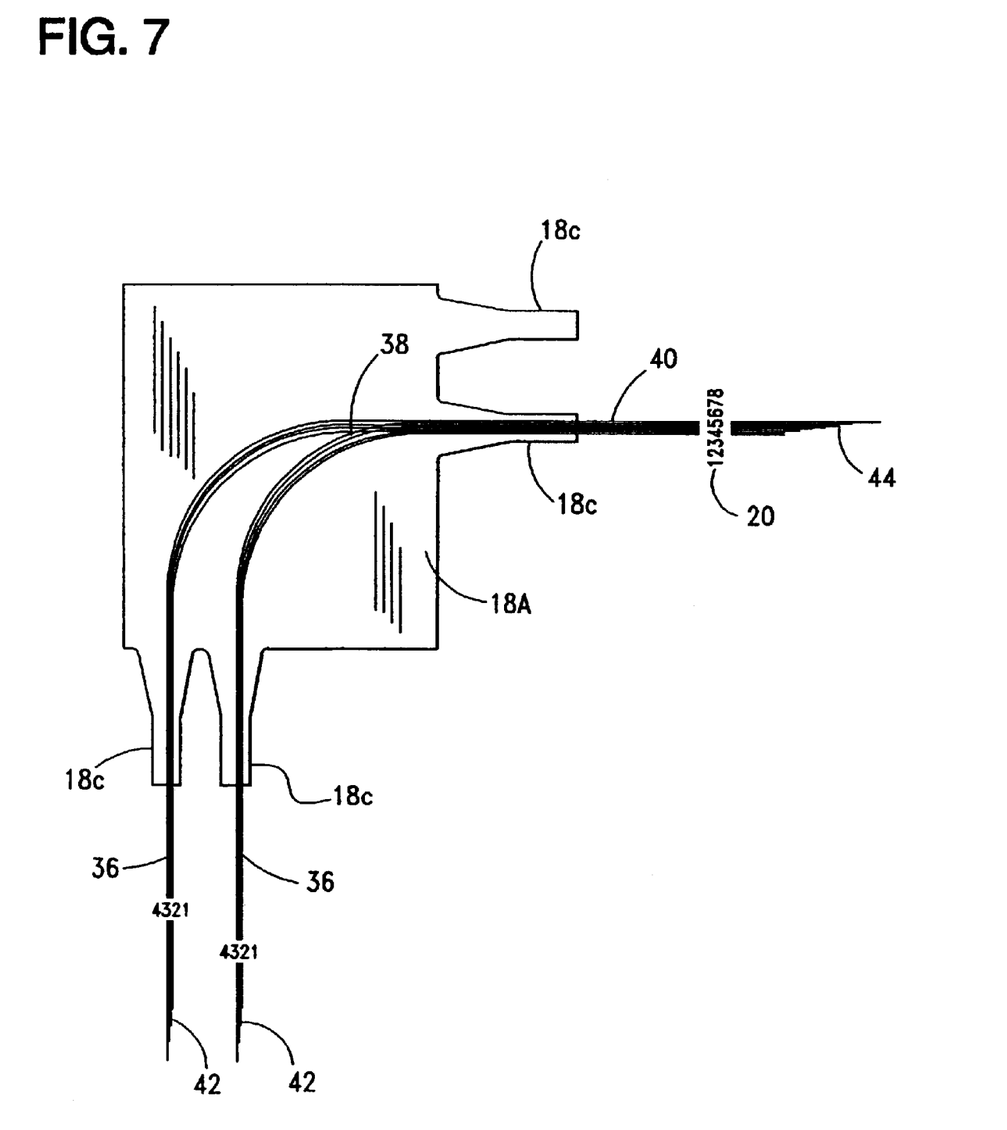
FIG. 7 is a plan view of the bottom layer of the multi-layered apparatus of FIG. 6.
Figure 8:
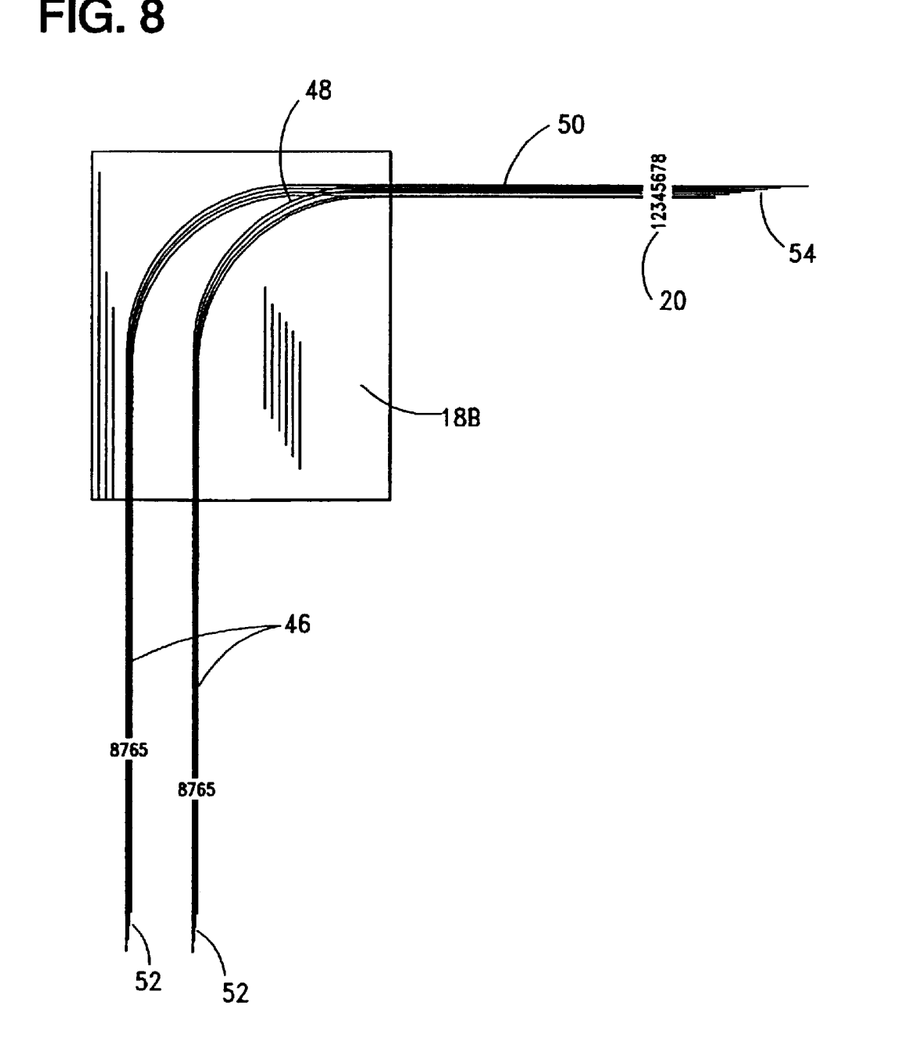
FIG. 8 is a plan view of the top layer of the multi-layered apparatus of FIG. 6.

FIGS. 6–9 show a second embodiment of a fiber optic apparatus, generally designated 10A, for cross-connecting the individual optical fibers of a plurality of fiber optic ribbons. Apparatus 10A is a multi-layered apparatus which includes at least a pair of stacked substrates. Specifically, FIG. 7 shows a bottom substrate 18A, and FIG. 8 shows a top substrate 18B. FIG. 6 shows the top substrate stacked on top of the bottom substrate. It also can be seen that only the bottom substrate 18A includes the tail portions 18c described above.

In routing and assembling multi-layered apparatus 10A, the individual fibers of a pair of input ribbons 36 are routed onto bottom substrate 18A as shown in FIG. 7. The individual fibers are joined, as at 38, to form a single output ribbon 40. It can be seen that the individual fibers of each input ribbon 36 are in a given sequence of "#1–#4". These fibers are cut-off at different lengths in a "wedge" pattern, as at 42 and described above. Similarly, output ribbon 40 which includes all of the individual fibers of both input ribbons 36 has the individual fibers cut-off, as at 44, to, again, define a wedge-shaped pattern whereby verification of the desired sequences of the fibers can be made.

Referring to FIG. 8, another pair of input ribbons 46 are routed onto top substrate 18B with the individual fibers of the input ribbons being joined, at 48, to form a single output ribbon 50. Again, the individual fibers of input ribbons 46 are cut-off in wedge-shaped patterns, as at 52, and the individual fibers of output ribbon 50 are cut-off in a wedge-shaped pattern, as at 54, for sequence verification purposes.

It can be seen that the fibers of each input ribbon 36 in FIG. 7 have been hypothetically designated "#1–#4", and the individual fibers in each input ribbon 46 in FIG. 8 are hypothetically designated "#5–#8", whereupon the fibers are joined in output ribbons with the joined fibers hypothetically designated "#1–#8".

Top substrate 18b (FIG. 8) then is positioned on top of bottom substrate 18A (FIG. 7) to form the multi-layered apparatus 10A as shown in FIG. 6.

Figure 9:
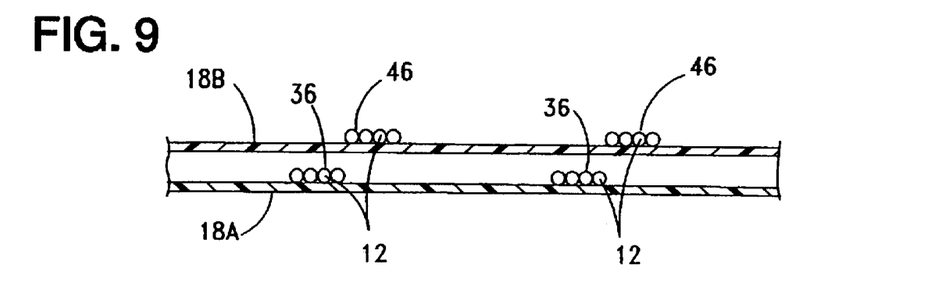
FIG. 9 is an enlarged section taken generally along line 9—9 of FIG. 6.

Finally, FIG. 9 is an enlarged, exploded and somewhat schematic illustration of a section taken generally along line 9—9 in FIG. 6. It can be seen how the individual fibers 12 of input ribbons 46 on top substrate 18b are offset to one side of the individual fibers of input ribbons 36 on bottom substrate 18A. When the substrates are joined or layered as in FIG. 6, the offset ribbons combine to form a uniform wedge-shaped pattern as shown at 60 in FIG. 6. This example of multi-layered apparatus 10A further shows the significant advantages of the system of the invention wherein the individual fibers simply are cut-off at different lengths in predetermined patterns correlated to the predetermined sequence of fibers routed through the entire apparatus.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fiber optic apparatus for cross-connecting the individual optical fibers of a plurality of fiber optic ribbons, comprising:

a substrate; and a plurality of individual optical fibers routed on the substrate to form at least one first fiber optic ribbon leading onto the substrate and at least one second fiber optic ribbon leading away from the substrate to a terminating end of the ribbon, the individual optical fibers of at least said second fiber optic ribbon being routed in a predetermined sequence from one side of the ribbon to an opposite side thereof, and the individual optical fibers at the terminating end of said second fiber optic ribbon being cut-off at different lengths in a predetermined pattern correlated to said predetermined sequence of fibers in order to visually identify any fiber which is out of the predetermined sequence.

2. The fiber optic apparatus of claim 1 wherein said individual optical fibers at the terminating end of said second fiber optic ribbon are cut-off at progressively different lengths from one side of the ribbon to an opposite side thereof.

3. The fiber optic apparatus of claim 1 wherein the individual optical fibers of both said first and second fiber optic ribbons arc routed in predetermined sequences, and the individual fibers of each fiber optic ribbon are cut-off at terminating ends thereof in predetermined patterns of different lengths.

4. The fiber optic apparatus of claim 1 wherein the individual optical fibers are routed on the substrate to form a plurality of said first fiber optic ribbons and a plurality of said second fiber optic ribbons, all of the fiber optic ribbons having terminating ends off of the substrate, and the individual fibers of each fiber optic ribbon being cut-off in predetermined patterns of different lengths.

5. The fiber optic apparatus of claim 1, wherein said substrate is generally flat.

6. A fiber optic apparatus for cross-connecting the individual optical fibers of a plurality of fiber optic ribbons, comprising:

a flat substrate; and a plurality of individual optical fibers routed on the substrate to form a plurality of first fiber optic ribbons leading onto the substrate and a plurality of second fiber optic ribbons leading away from the substrate, all of the fiber optical ribbons having terminated ends off the substrate, the individual optical fibers of the ribbons being routed in predetermined sequences from one side of each ribbon to an opposite side thereof, and the individual optical fibers at the terminating end of at least one of the ribbons being cut-off at progressively different lengths from one side of the ribbon to an opposite side thereof in order to visually identify any fiber which is out of the predetermined sequence.

7. A fiber optic apparatus of claim 6 wherein said substrate is generally flat.

8. A method of fabricating a fiber optic apparatus for cross-connecting the individual optical fibers of a plurality of fiber optic ribbons, comprising:

providing a generally flat substrate;

routing a plurality of individual optical fibers on the substrate to form at least one first fiber optic ribbon leading onto the substrate and at least one second fiber optic ribbon leading away from the substrate to a terminating end of the ribbon, the individual optical fibers of at least said second fiber optic ribbon being routed in a predetermined sequence from one side of the ribbon to an opposite side thereof; and cutting-off the individual optical fibers at the terminating end of said second fiber optic ribbon at different lengths in a predetermined pattern correlated to said predetermined sequence of fibers in order to visually identify any fiber which is out of the predetermined sequence.

9. The method of claim 8 wherein the individual fibers at the terminating end of said second fiber optic ribbon are subsequently cut-off to the same lengths for termination thereof.

10. The method of claim 9, including the step of terminating a fiber optic connector to the terminating end of said second fiber optic ribbon.

* * * * *